(12) United States Patent
Zhang et al.

(10) Patent No.: US 8,849,738 B2
(45) Date of Patent: Sep. 30, 2014

(54) PREDICTING A USER BEHAVIOR NUMBER OF A WORD

(75) Inventors: Tao Zhang, Hangzhou (CN); Jiaqing Guo, Hangzhou (CN); Ning Guo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/318,439

(22) PCT Filed: Jul. 29, 2011

(86) PCT No.: PCT/US2011/045981
§ 371 (c)(1),
(2), (4) Date: Nov. 1, 2011

(87) PCT Pub. No.: WO2012/016195
PCT Pub. Date: Feb. 2, 2012

(65) Prior Publication Data
US 2013/0144822 A1    Jun. 6, 2013

(30) Foreign Application Priority Data

Aug. 2, 2010  (CN) .......................... 2010 1 0244565

(51) Int. Cl.
G06N 5/02       (2006.01)
G06Q 30/00      (2012.01)
G06F 17/30      (2006.01)
G06Q 10/00      (2012.01)

(52) U.S. Cl.
CPC ................. G06N 5/02 (2013.01); G06Q 30/00 (2013.01); G06F 17/30943 (2013.01); G06Q 10/00 (2013.01)
USPC .......................................................... 706/46

(58) Field of Classification Search
CPC .............. G06Q 30/02; G06Q 30/0202; G06Q 30/0242; G06Q 10/04
USPC ........................................................... 706/46
See application file for complete search history.

(56) References Cited

U.S. PATENT DOCUMENTS 6,904,408 B1    6/2005  McCarthy et al.
7,739,143 B1    6/2010  Dwarakanath et al.
(Continued)

FOREIGN PATENT DOCUMENTS

CN    101562534 A    10/2009
GB    2456894         8/2009

OTHER PUBLICATIONS

PCT Search Report and written opinion mailed Dec. 16, 2011 for PCT application No. PCT/US11/45981, 8 pages.

(Continued)

*Primary Examiner* — Kakali Chaki
*Assistant Examiner* — Michael Zidanic
(74) *Attorney, Agent, or Firm* — Lee & Hayes, PLLC

(57) ABSTRACT

The present disclosure introduces a method, an apparatus and memory of predicting a user behavior number of a word for reducing the amount and the complexity of operation, saving the consumption of the equipment, and improving the accuracy and reliability of predictions. In an embodiment, a historical data sequence of the user behavior number of a word is converted from a time domain to a frequency domain. Based on the converted frequency domain, each estimated cycle and its effect rate value of the historical data sequence are ascertained. If the historical data sequence is stable, an average value of user behavior numbers of some historical data points before a prediction point is calculated as a user behavior number of the prediction point. Otherwise, the user behavior number is calculated based on a selected main cycle and a selected singularity.

20 Claims, 6 Drawing Sheets

(56) References Cited

U.S. PATENT DOCUMENTS

| | | |
|---|---|---|
| 2005/0050215 A1 | 3/2005 | Lin et al. |
| 2006/0293921 A1 | 12/2006 | McCarthy et al. |
| 2007/0162329 A1 | 7/2007 | Lee |
| 2007/0239703 A1 | 10/2007 | Wang et al. |
| 2008/0004904 A1 | 1/2008 | Tran |
| 2009/0037421 A1 | 2/2009 | Gamble |
| 2009/0254397 A1 | 10/2009 | Mahdian et al. |
| 2010/0082421 A1 | 4/2010 | Tuladhar et al. |
| 2010/0153391 A1 | 6/2010 | Reese |
| 2010/0185499 A1 | 7/2010 | Dwarakanath et al. |
| 2010/0250335 A1 | 9/2010 | Cetin et al. |
| 2010/0250512 A1 | 9/2010 | Miller et al. |
| 2010/0306161 A1 | 12/2010 | Chen et al. |
| 2011/0082742 A1 | 4/2011 | Stokes |
| 2011/0231241 A1 | 9/2011 | Kesari et al. |

OTHER PUBLICATIONS

Extended European Search Report mailed Feb. 3, 2014 for European patent application No. 11815119.0, 7 pages.

Translated Chinese Office Action mailed Dec. 17, 2012 for Chinese patent application No. 201010244565.6, a counterpart foreign application of U.S. Appl. No. 13/318,439, 18 pages Translated Chinese Office Action mailed Aug. 7, 2013 for Chinese patent application No. 201010244565.6, a counterpart foreign application of U.S. Appl. No. 13/318,439, 7 pages.

PREDICTING A USER BEHAVIOR NUMBER
OF A WORD

CROSS REFERENCE TO RELATED PATENT
APPLICATIONS

This application is a national stage application of an international patent application PCT/US11/45981, filed Jul. 29, 2011, which claims priority to Chinese Patent Application No. 201010244565.6, filed on Aug. 2, 2010, entitled "Method and Apparatus of Predicting a User Behavior Number of a Word," which applications are hereby incorporated by reference in their entirety.

TECHNICAL FIELD

The present disclosure relates to the field of Internet technology and, specifically, to a method and an apparatus of predicting a user behavior number with respect to words in web sites.

BACKGROUND

In the field of Internet technology, for a web site or a search engine, traffic and a click rate of a web site vary regularly and can be efficiently predicted based on historical data. However, traffic and a click rate of a word do not change regularly. Here, a few basic concepts are presented for clarification. Traffic of a word means how many times a word is searched during a period of time in a web site or a search engine. A click rate of a word means how many times a word is clicked during a period of time in a web site or a search engine. Traffic of a web site means a sum of the traffic of all words during a period of time in a web site or a search engine. A click rate of a web site means a sum of the click rates of all words during a period of time in a web site or a search engine. The period of time can be set according to real practice, and is set as one day usually.

In the present disclosure, traffic and/or a click rate of a word are collectively called a user behavior number. In conventional technology, for words whose user behavior numbers do not change with the time period dramatically, an average value of the user behavior numbers in the previous time period can be adopted to predict the user behavior numbers in the current time period. For words whose user behavior numbers change with the time period regularly, a time sequence model can be used to create a model for the regular changes to predict the user behavior numbers; alternatively, a current prediction algorithm (e.g., a machine study, a data envelop analysis, etc.) can be used to predict the user behavior numbers.

However, the conventional technology described above has several problems. As it is very difficult to predict variation of user behavior numbers with the period of time and whether the changes are regular, an efficient prediction algorithm cannot be chosen precisely, and the reliability of prediction is poor. As a result, only the sequences that meet certain requirements can be used to apply the time sequence model to prediction. Moreover, the sequence of the user behavior number of a word in practice generally does not meet the requirements. On the other hand, if a prediction algorithm other than the time sequence model is used, an amount and complexity of operations as well as consumption of equipments would be quite great. In the Internet technology field, it is impossible to create different prediction models for individual words as the number of words is extremely high; furthermore efficiency and the accuracy of predictions decrease if creating the prediction models by categories.

Accurate predictions of future data can help operators of a web site predict potential traffic and click rates of the web site server and therefore adjust the operation of the web site server accordingly. For example, if traffic and a click rate of a web site increase dramatically, an expansion of server capacity may be needed. On the other hand, if traffic and the click rate of the web site decrease, idle servers can be used for other business. Given the above, with the conventional method of predicting traffic and click rates of words, accuracy and reliability of predictions are poor, and the amount and complexity of operations as well as consumption of equipment would be quite great.

SUMMARY

The present disclosure introduces a method and an apparatus of predicting a user behavior number of a word. The techniques described herein address problems such as low accuracy and reliability of predictions, equipment utilization and performance, and operation complexity, which exist in conventional techniques of predicting a user behavior number of a word.

The present disclosure introduces a method of predicting a user behavior number of a word. In an embodiment, a conversion unit converts a historical data sequence of the user behavior number of the word from a time domain to a frequency domain. Based on the converted frequency domain sequence, a deciding unit ascertains one or more estimated cycles of the historical data sequence and an effective rate value of each of the estimated cycles. Based on each estimated cycle and its effective rate value of the historical data sequence, a determination unit determines whether the historical data sequence meets a stable sequence standard. If the historical data sequence is stable, a first prediction unit calculates the user behavior number of a prediction point based on an average value of user behavior numbers of the historical data sequence before the prediction point. If the historical data sequence is not stable, a selection unit selects a main cycle and a singularity of the historical data sequence based on each of the estimated cycles. Based on the selected main cycle and the selected singularity, a second prediction unit calculates the user behavior number of a prediction point.

In accordance with the method and the apparatus of predicting a user behavior number of a word provided by the present disclosure, first, a historical data sequence of a user behavior number of a word is converted from a time domain to a frequency domain so as to decide each estimated cycle and its effect rate value of the historical data sequence, and to determine whether the user behavior number of the word varies dramatically and/or regularly. For a stable sequence, an average value algorithm is used for prediction; for an unstable sequence, a main cycle and a singularity are selected for obtaining a user behavior number of the prediction point based on the selected main cycle and the selected singularity. As different prediction algorithms are used for different sequences, the operation loading of a system is reduced. For the historical data of a stable sequence, the future data can be rapidly predicted; for the historical data of an unstable sequence, the future data can be accurately and reliably predicted. The method and the apparatus of predicting a user behavior number of a word provided by the present disclosure can be even used in the Internet technology which uses a large number of words. In addition, the conversion from a time domain to a frequency domain and the prediction algorithms for a stable sequence and an unstable sequence can be implemented easily. Consequently, the amount and the complexity of operation of equipment can be reduced, and so can the consumption of the equipment.

Features and advantages of the present disclosure are illustrated in the following detailed description. The objectives and advantages of the present disclosure can be implemented and accomplished by the structures disclosed in the specification, claims, and drawings.

DETAILED DESCRIPTION

Figure 1:
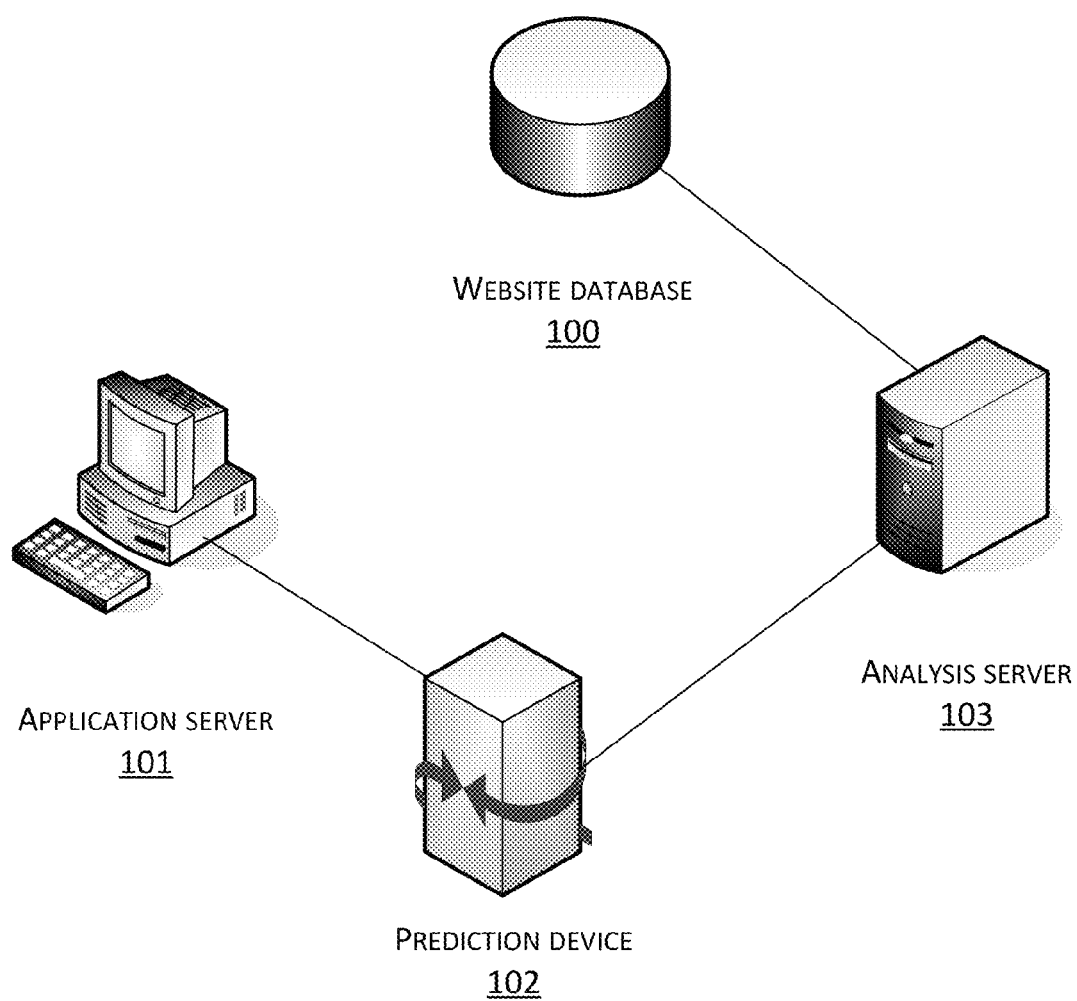
FIG. 1 is a schematic diagram of an architecture used to predict a user behavior number of a word in accordance with one embodiment of the present disclosure.

Prediction of a user behavior number of a word (e.g., traffic, a click rate of a word, etc.) is described herein. In an embodiment, a historical data sequence is initially converted from a time domain to a frequency domain. Based on the converted frequency domain, an estimated cycle and its effective rate value of the historical data sequence are ascertained. Stability of the historical data sequence is determined. Based on the stability, different prediction algorithms are used to predict the user behavior number and consequently, the amount and the complexity of operation of equipment can be reduced, and so can the consumption of the equipment.

Further description of various embodiments of the present disclosure is given in details in conjunction with the drawings. It should be understood that the embodiments are merely for describing and explaining the present disclosure and are not intended to limit the scope of the present disclosure. Without confliction, the embodiments and the features of embodiments of the present disclosure can be combined.

A few basic concepts are presented for clarification before describing the various embodiments.

The prediction of a user behavior number of a word is a prediction of the future data based on the historical data of a user behavior number of a word (e.g., the traffic or the click rate). It should be noted that time cycles corresponding to the historical data and the future data are consistent. In general, the so-called word is the word for searching, purchasing, and so forth. For example, if a time cycle is one day, the traffic of the $31^{st}$ and the $32^{nd}$ days can be predicted based on the traffic of the last 30 days. If a time cycle is an hour, the click rate of the $21^{st}$, the $22^{nd}$, and the $23^{rd}$ hours can be predicted based on click rate of the last 20 hours.

To implement the prediction of a user behavior number of a word, the historical data sequence of user behavior numbers of the word must be known and the number of the prediction points must be designated. The historical data sequence of user behavior numbers of the word is a sequence composed of the historical data points representing time points and historical data, while the prediction points represent the time points and the future data. For example, for predicting the traffic of the $31^{st}$ and the $32^{nd}$ days based on the traffic of a word in the last 30 days, the historical data sequence is composed of the historical data points of the last 30 days, and each historical data point represents the traffic of a specific date (one of the $1^{st}$ to the $30^{th}$ days) and the traffic of that day; there are two prediction points in this example, and each prediction point represents the prediction traffic of a specific date (the $31^{st}$ day or the $32^{nd}$ day) and the traffic of that day.

In the field of Internet technology, a singularity means the point in time when an obvious change of a user behavior number of a word occurs on Internet. For example, user behavior numbers of a word, before and after that point in time, are in different orders of magnitude, or the user behavior number of a word significantly increase or decrease before or after that point in time.

FIG. 1 shows one implementation of a network structure of the prediction system. The system includes a website database 100, an application server 101, a prediction device 102, and an analysis server 103. These functional parts of the system are shown interconnected via a network, which may be wired or wireless, and may be implemented using any number of architectures (e.g., LAN, WLAN, or Internet, etc.)

The website database 100 has memory to store a web site diary, in which the information such as the search, click, and operation time of each word of users, is recorded.

The application server 101 provides various application services based on the prediction of the user behavior number of a word. For instance, the application server may provide a user interface (UI), initiate a prediction request for the user behavior number of a word according to a requirement of an operator, and present the prediction result (i.e., the user behavior number of the prediction points).

The prediction device 102 generates the analysis request according to the prediction request initiated by the application server 101 and sends the analysis request to the analysis server 103. The prediction device 102 further obtains the user behavior number of the prediction point according to the historical data sequence of the user behavior number of a word returned by the analysis server 103, and returns the user behavior number of the prediction point to the application server 101.

The analysis server 103 analyzes the web site diary of the web site database 100 according to the analysis request from the prediction device 102. The analysis server 103 extracts the historical data sequence of the user behavior of a word from the analysis result, and returns it back to the prediction device 102.

Figure 2:
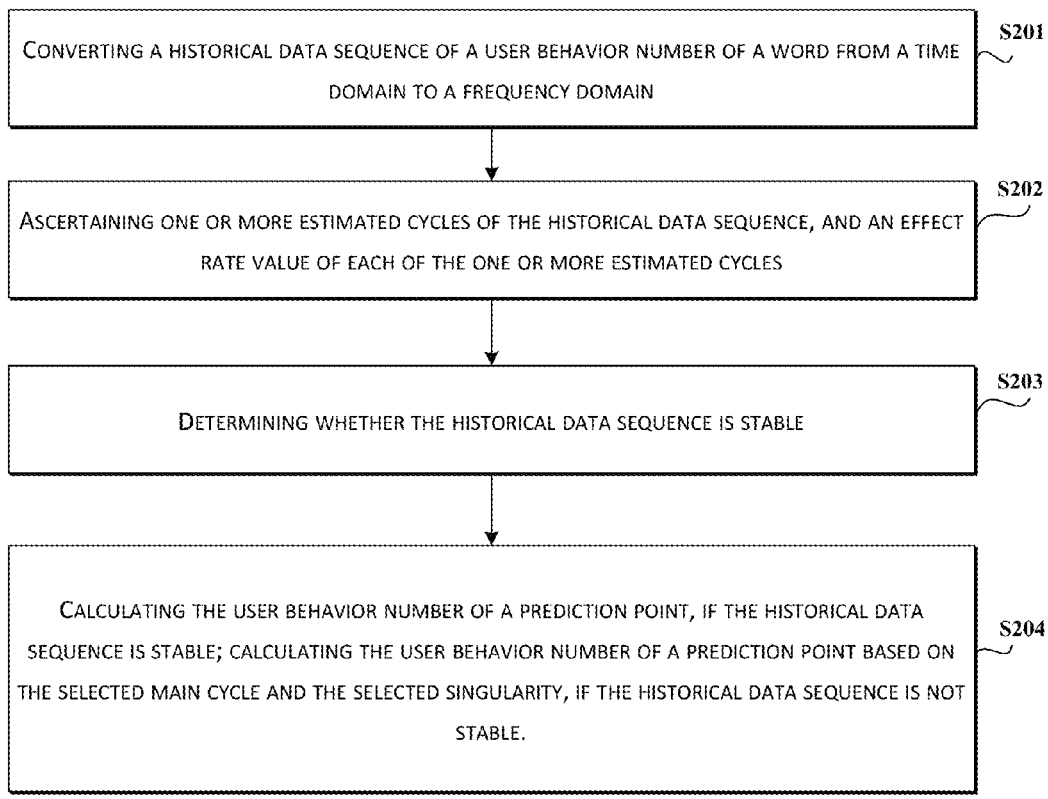
FIG. 2 is a flowchart of an exemplary process for predicting an unstable sequence in accordance with an embodiment of the present disclosure.

FIG. 2 shows an exemplary method of predicting the user behavior number of a word. At operation S201, a historical data sequence of the user behavior number of the word is converted from a time domain to a frequency domain. At operation S202, based on the converted frequency domain, each estimated cycle and its effect rate value of the historical data sequence are ascertained. The estimated cycle is the possible cycle of the frequency domain sequence (i.e., the cycle value obtained based on the frequency value), and the effect rate value is the ratio of the estimated cycle and the frequency domain sequence.

At operation S203, stability of the historical data sequence is determined based on each estimated cycle and its effect rate value of the historical data sequence. If the historical data sequence is stable, at operation S204, an average value of user behavior numbers of some historical data points before a prediction point is calculated as a user behavior number of the prediction point. If the historical data sequence is not stable, the user behavior number of the prediction point is calculated based on a main cycle and singularity of the historical data sequence that are selected based on each estimated cycle and its effect rate value.

In an embodiment, the extraction process of the historical data sequence of the user behavior number of a word at operation S201 is described below. The application server 101 initiates a prediction request to the user behavior number of a word according to the requirement of the operator. The prediction device 102 generates the analysis request according to the prediction request initiated by the application server and sends the analysis request to the analysis server 103. The analysis server 103 analyzes the website diary of the website database 100 according to the analysis request sent from the prediction device, extracts the historical data sequence of the user behavior of a word from the analysis result, and returns it back to the prediction device. Accordingly, the prediction device 102 can conduct the conversion from a time domain to a frequency domain of a historical data sequence of the user behavior number of the word.

In general, a Fast Fourier Transformation (FFT) or a Wavelet Transformation can be used for converting the historical data sequence from a time domain to a frequency domain. FFT is a fast Discrete Fourier Transformation (DFT). For the historical data sequence of the user behavior number of a word, the time domain is the coordinate system used for describing the time characteristics of the domain. The waveform of the time domain represents the changes of the historical data of the user behavior of a word with time, as the horizontal axis represents the time and the vertical axis represents the corresponding historical data. The frequency domain is the coordinate system used for describing the frequency characteristics of the domain. The waveform of the frequency domain represents the effect rate value of each possible cycle (i.e., the estimated cycle) of the historical data sequence, as the horizontal axis represents the frequency corresponding to the estimated cycle and the vertical axis represents the effect rate value of the estimated cycle corresponding to the frequency point.

In an embodiment, at operation S202, the principles are presented by taking FFT as an example.

The Discrete Fourier Transformation equation is shown as equation [1]:

$$X(k) = \sum_{n=0}^{N-1} x(n)e^{-j\frac{2\pi}{N}nk} \quad [1]$$

x(n) means the historical data sequence of the user behavior number of a word, X(k) means the converted frequency domain sequence, which is a sequence using the frequencies as the horizontal coordinates. Each frequency value corresponds to a possible cycle (i.e., the estimated cycle) of the historical data sequence. The vertical coordinate value X(k) corresponding to the frequency value k is the effect rate value of the estimated cycle corresponding to the frequency k. Further, the corresponding estimated cycle is calculated according to the frequency value k of the frequency domain sequence, and the effect rate value of the estimated cycle is obtained according to the vertical coordinate X(k) corresponding to the frequency value k.

The relationship between the frequency k and the estimated cycle is shown below.

The Discrete Fourier Reverse Transformation equation is shown as equation [2]:

$$x(n) = \frac{1}{N}\sum_{k=0}^{N-1} X(k)e^{j\frac{2\pi}{N}nk} \quad [2]$$

Assume the cycle of x(n) is T, than equation [3] is given as below:

$$\frac{2\pi}{N}k(n+T) = \frac{2\pi}{N}kn + \frac{2\pi}{N}kT \quad [3]$$

According to equation [3], we can get equation [4]:

$$T = \frac{N}{k} \quad [4]$$

Equation [4] represents the relationship between the frequency value k and the estimated cycle, wherein N means the number of points of the historical data sequence of the user behavior number of a word, and the number of points means the number of historical data points of the historical data sequence; k means the value of the $k^{th}$ frequency, the range of values is [1, N−1]; T means the estimated cycle.

Figure 3A:
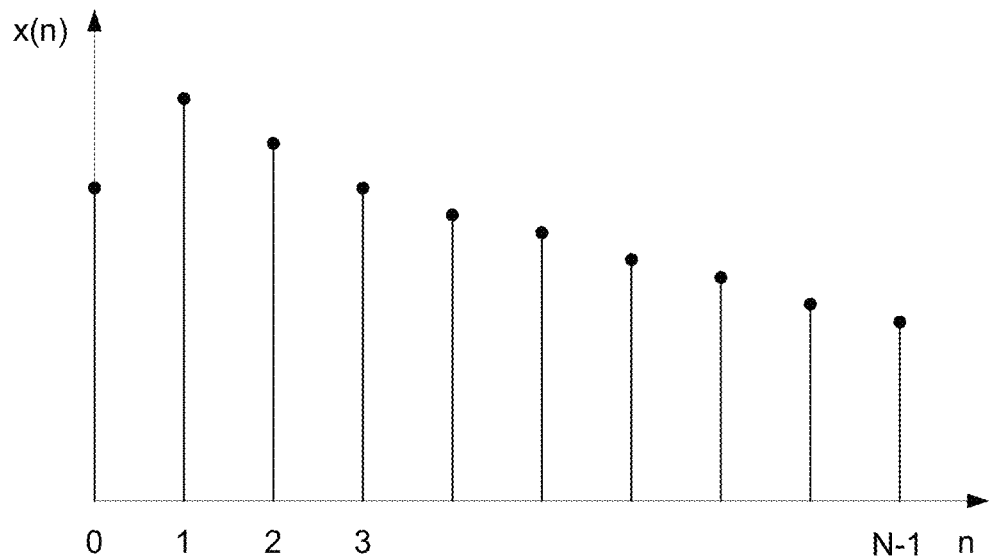
FIG. 3a illustrates a waveform of a time domain of a historical data sequence in accordance with an embodiment of the present disclosure.
Figure 3B:
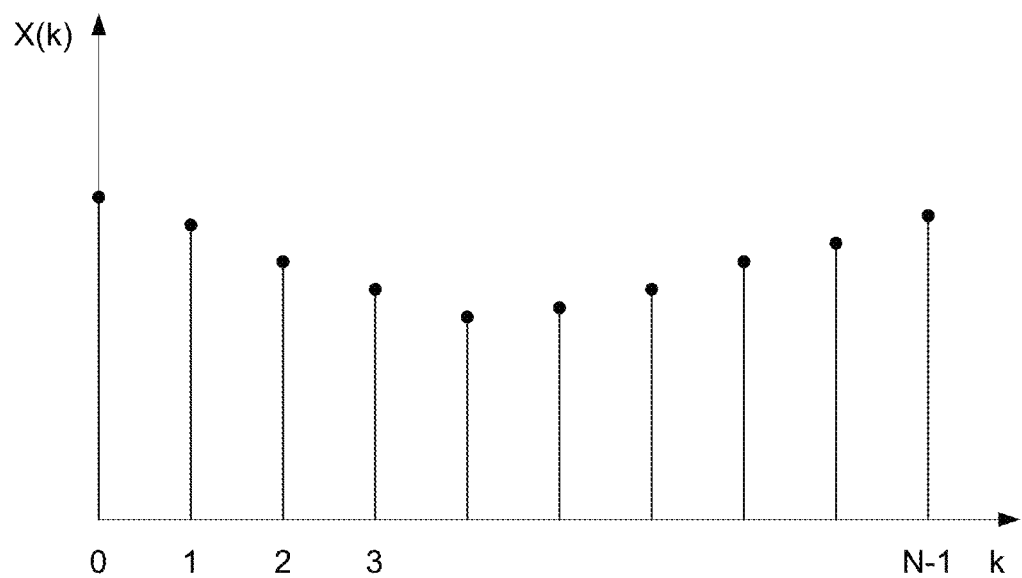
FIG. 3b illustrates a waveform of a frequency domain of a historical data sequence in accordance with an embodiment of the present disclosure.

For example, if the historical data sequence of a user behavior number of a word is the traffic of a word in the past N days, the waveform of the time domain is shown as FIG. 3a, and the frequency domain sequence can be obtained by using FFT to conduct the conversion from the time domain to the frequency domain of the historical data sequence, and the waveform of the frequency domain is as shown in FIG. 3b. According to the frequency domain sequence, the vertical coordinate value x(k) corresponding to the frequency value k is used as the effect rate value of the estimated cycle corresponding to the frequency value k. In conjunction with Equation [4], the estimated cycle and its effect rate value can be calculated according to the frequency value k. If the number of points N of the traffic of a word is 40, the corresponding vertical coordinate is x(k)6, the estimated cycle corresponding to the frequency k=4 is $$T = \frac{N}{k} = \frac{40}{4} = 10,$$

and the effect rate value x(k) of the estimated cycle 10 is 6, according to Equation [4].

In an embodiment, at operation S202, the historical data sequence of the user behavior number of a word is extracted from the analysis result of the website diary, and the output result can be generated by using each historical data of the historical data sequence as the input data of FFT. Each possible cycle (known as the "estimated cycle" in the present disclosure) of the historical data sequence can be obtained according to each frequency value of the output result. The effect rate value corresponding to each frequency value is the effect rate value of the estimated cycle corresponding to the each frequency value.

The so-called stable sequence means a sequence which does not present clear and regular changes, while the clear and regular changes are the cyclic changes. A sequence x(t) is deemed a stable sequence if it meets the following condition; otherwise it is an unstable sequence:

1. For any t∈N, $EX_t^2 < +\infty$ (the square of the mathematical expectation is less than positive infinite)
2. For any t∈N, $EX_t = \mu$ (the mathematical expectation is a constant)
3. For ant t,s∈N, $E[(X_t-\mu)(X_s-\mu)] = \gamma_{t-s}$ (the auto-covariance function is a constant)

In an embodiment of S203, the preset stable sequence standard includes: none of the effect rate values of all estimated cycles exceeds a set effect rate threshold. In general, the effect rate threshold is 10. In one implementation, the stable sequence standard can be set according to different applications, for example, at least 90% of the effect rate values of the estimated cycles do not exceed the set effect rate threshold.

For example, for a historical data sequence of the user behavior number of a word, if all estimated cycle points and the effect rate values are as shown in Table 1, the historical data sequence can be determined as a stable sequence. If all estimated cycle points and the effect rate values are as shown in Table 2, the historical data sequence can be determined as an unstable sequence.

TABLE 1

| Estimated cycle | Effect rate value |
|---|---|
| 10 | 6 |
| 3 | 5 |
| 15 | 3 |
| 128 | 3 |

TABLE 2

| Estimated cycle | Effect rate value |
|---|---|
| 7 | 1000 |
| 42 | 800 |
| 63 | 380 |
| 16 | 260 |

In an embodiment, at operation S204, for a stable sequence, the specific number of the historical data points can be set according to applications.

In an embodiment, at operation S204, for an unstable sequence, a main cycle and a singularity of the historical data sequence may be selected according to each estimated cycle and its effect rate value.

The main cycle means the most likely estimated cycle among all estimated cycles of the historical data sequence. Therefore, an estimated cycle that is within a main cycle range and has the largest effect rate value is made as the main cycle according to the configured main cycle range; and an estimated cycle that is not the main cycle and has the largest effect rate value is made as the singularity.

For example, for a historical data sequence of user behavior numbers of a word, if all estimated cycle points and the effect rate values are as shown in Table 2, for an application whose time cycle is a day, if the main cycle range is determined as less than or equal to 7 by analyzing a great amount of data experiments and real business data, 7 is selected as the main cycle and 42 is the singularity.

One exemplary implementation for obtaining a user behavior number of the prediction point based on the selected main cycle and the selected singularity may include choosing each historical data point after the selected singularity of the historical data sequence for composing a training data sequence. A time sequence model is then used to create a model of the training data sequence and obtain a solution.

Figure 4:
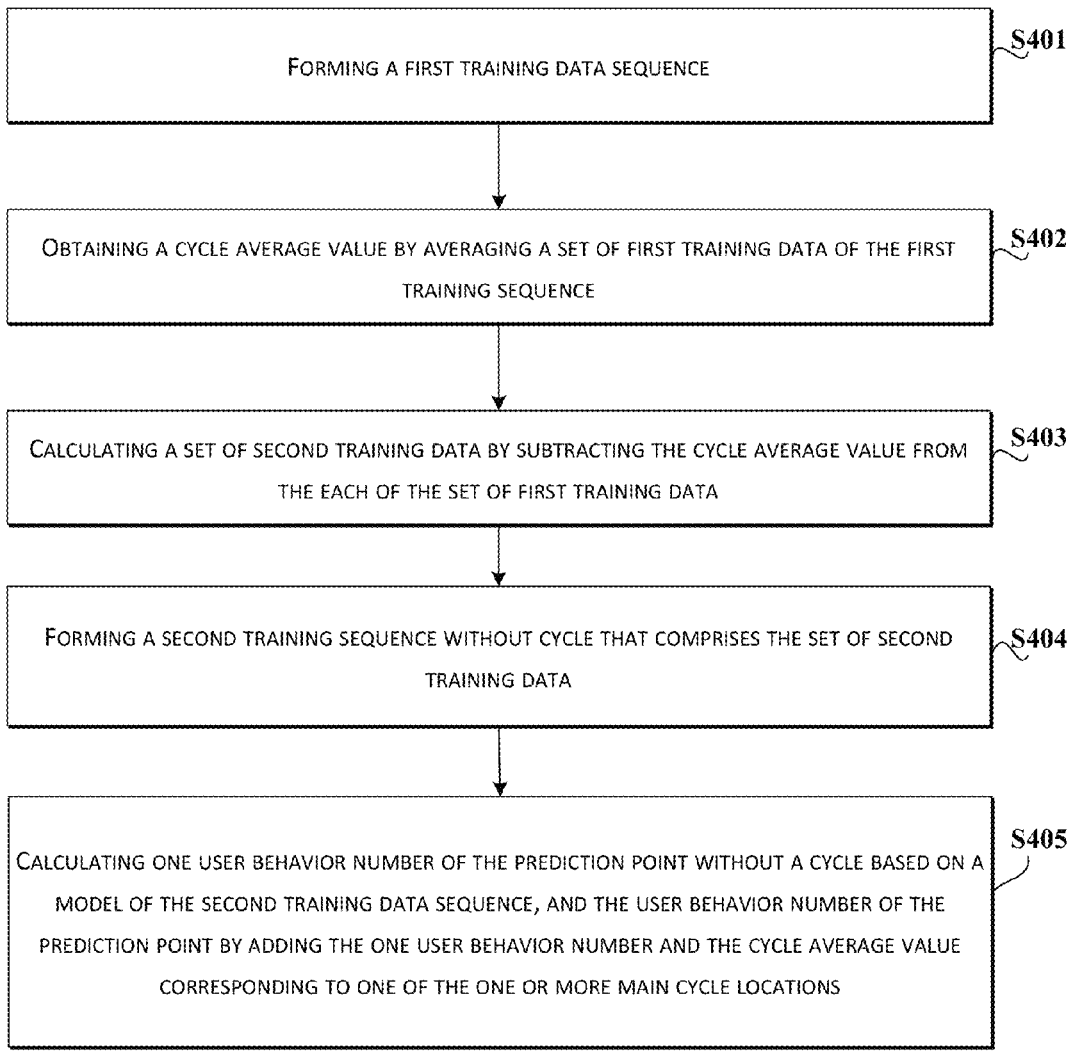
FIG. 4 is a flowchart of an exemplary process for obtaining the user behavior number of a prediction point based on a selected main cycle and a selected singularity.

FIG. 4 shows another implementation for obtaining a user behavior number of the prediction point based on the selected main cycle and the selected singularity. At operation S401, a first training data sequence is formed. The first training date sequence includes a set of data associated with individual historical data points of a historical data after a historical data point corresponding to a selected singularity. At operation S402, a cycle average value is obtained by averaging a set of first training data of the first training sequence. Each set of first training data corresponds to one or more main cycle locations. At operation S403, a set of second training data is calculated by subtracting the cycle average value from the each set of first training data. At operation S404, a second training sequence without cycle that includes the set of second training data is formed. At operation S405, one user behavior number of the prediction point without a cycle is calculated based on a model of the second training data sequence. The model is created by using a time sequence model.

In general, the time sequence model adopts the ARMA model (Auto-Regressive and Moving Average Model), which is a mixture of the AR model (Auto-Regressive Model) and the MA model (Moving Average Model). The definition of the ARMA model is as equation [5]:

$$ARMA(p, q) = \begin{cases} x_t = \varphi_0 + \varphi_1 x_{t-1} + \ldots + \varphi_p x_{t-p} + \varepsilon_t - \theta_1 \varepsilon_{t-1} - \ldots - \theta_q \varepsilon_{t-q} \\ \varphi_p \neq 0, \theta_q \neq 0 \\ E(\varepsilon_t) = 0, Var(\varepsilon_t) = \sigma_\varepsilon^2, E(\varepsilon_t \varepsilon_s) = 0, s \neq t \\ Ex_s \varepsilon_t = 0, \forall s < t \end{cases} \quad [5]$$

wherein $\varepsilon_t$ means a white noise sequence and $\phi$, $\theta$ are parameters.

In certain embodiments, each training data of the training data sequence without a cycle is used as the input data of the ARMA model, and the parameter values of $\phi$ and $\theta$ can be obtained by using the parameter estimation algorithms (the Least Square algorithm, the Maximum Likelihood algorithm, etc.). The parameter values of $\phi$ and $\theta$ can be used in the ARMA model. Each training data of the training data sequence without a cycle is used as the input data of the ARMA model (with the parameter values of $\phi$ and $\theta$), the prediction result of the prediction points, i.e., the user behavior number without a cycle, can be obtained according to the output result.

At operation S406, the user behavior number of the prediction point is calculated by adding the one user behavior number and the cycle average value corresponding to one of the one or more main cycle locations.

Some examples are given below for describing the specific implementation process. Assume that the training data sequence of the traffic of a word is 1.1, 2.1, 3.1, 3.9, 0.9, 2.2, 2.9, 4.1, the unit is 100 times, and the selected main cycle is 4. It should be noted that the example here is based on the presumption of one training data sequence.

In an embodiment, in step 1, an average value operation of each training data every 4 locations is calculated and the following results are obtained: a cycle average value corresponding to the first main cycle location: $(1.1+0.9)/2=1$; a cycle average value corresponding to the second main cycle location: $(2.1+2.2)/2=2.15$, a cycle average value corresponding to the first main cycle location: $(3.1+2.9)/2=3$; a cycle average value corresponding to the first main cycle location: $(3.9+4.1)/2=4$.

In step 2, the corresponding cycle average value of each main cycle location is subtracted from its training data and the following results are obtained respectively: $1-1=0.1$, $2.1-2.15=-0.05$, $3.1-3=0.1$, $3.9-4=-0.1$, $0.9-1=-0.1$, $2.2-2.15=0.05$, $2.9-3=-0.1$ and $4.1-4=0.1$.

Therefore, the training cycle sequence without a cycle is: 0.1, −0.05, 0.1, −0.1, −0.1, 0.05, −0.1, 0.1.

In step 3, the ARMA model is used to create a model of the training data sequence without a cycle and get a solution, and a user behavior number of the prediction point without a cycle (i.e., the prediction result) is obtained. If the number of prediction points is 3, the prediction result (the user behavior number of each prediction point without a cycle) is: −0.05, 0.1, 0.05.

In step 4, the user behavior number of the prediction point without a cycle and a corresponding cycle average value of its main cycle location is added, and the following results are obtained: a user behavior number of the first prediction point is 0.95 (−0.05+1=0.95), a user behavior number of the second prediction point is 2.25 (0.1+2.15=2.25); a user behavior number of the third prediction point is 3.05 (0.05+3=3.05).

As the time sequence model is very sensitive to the singularity, sometimes the training data without a cycle may still have few singularities, and consequently, the prediction result based on the time sequence model has a greater offset. Accordingly, the present disclosure further adopts an algorithm that combines the average value algorithm and the time sequence model for determining the prediction result based on the time sequence model. If the prediction result has a great offset, the average value algorithm based on the main cycle is used to replace the time sequence model for re-conducting the prediction. For example, the main cycle of a historical data sequence (the time cycle is 1 day) is 7, and the average value of the historical data in the past 7 days before the current prediction points is used as the prediction result if the prediction result based on the time sequence model is found to have a great offset after evaluation. In other words, the prediction method further comprises the following steps: adopting an average value of training data of a previous main cycle before the prediction point without a cycle as the user behavior number of the prediction point without a cycle if an deviation of a current user behavior number of the prediction point exceeds a preset deviation threshold; and adding the user behavior number of the prediction point without a cycle and a corresponding cycle average value of its main cycle location, and getting a user behavior number of the prediction point.

Figure 5:
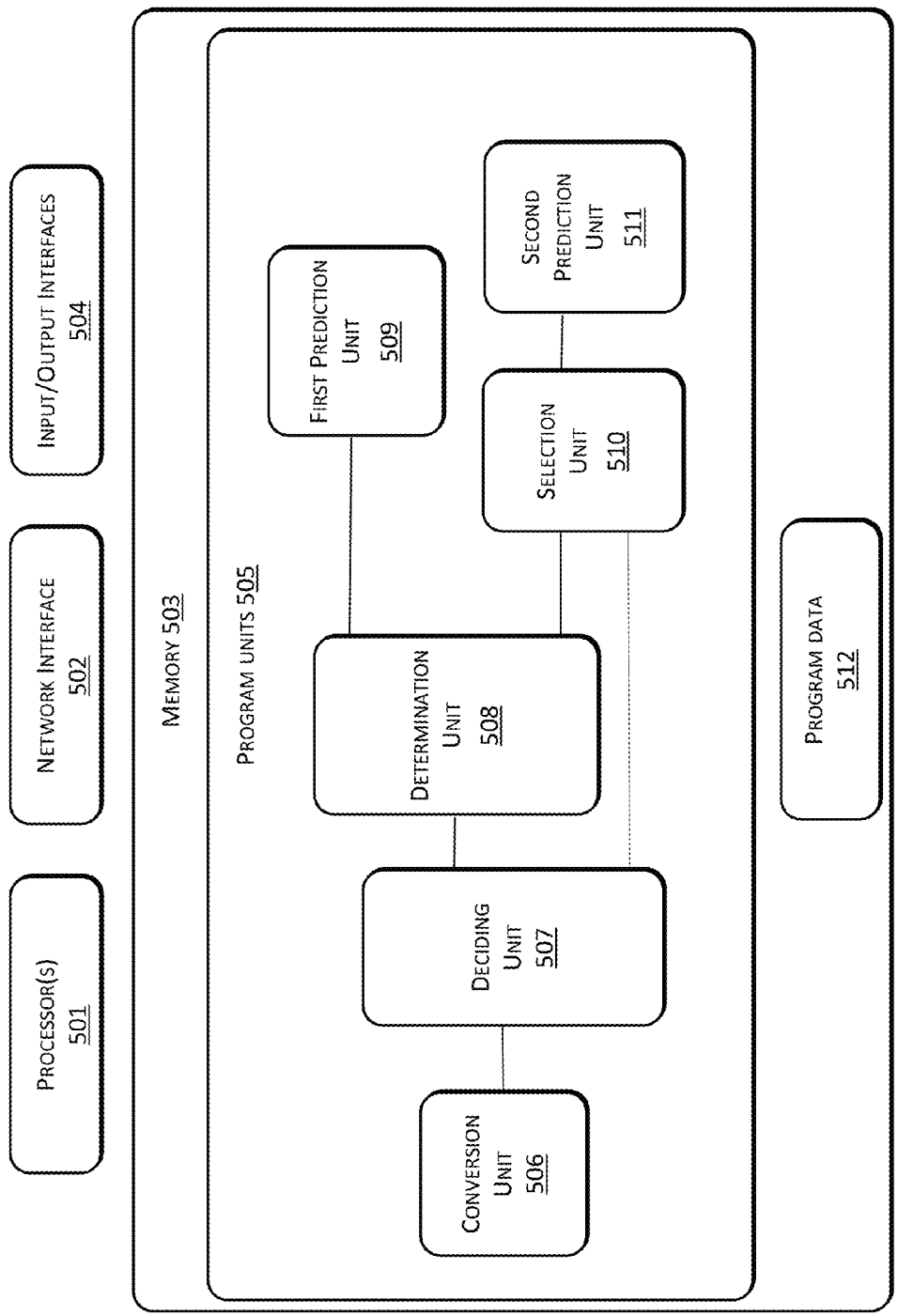
FIG. 5 is a block diagram of an apparatus of predicting a user behavior number of a word in accordance with an embodiment of the present disclosure.

The structure and the function of the prediction apparatus in a system of predicting the user behavior number of a word is described in details. As the principles of the prediction apparatus are similar to the method of predicting the user behavior number, the implementation of the prediction apparatus can be referred to the embodiments of the method for clarity. The structure of the prediction apparatus, as illustrated in FIG. 5, includes one or more processor 501, network interface 502, input/output interfaces 504 and memory 503.

The memory 503 may include computer-readable media in the form of volatile memory, such as random-access memory (RAM) and/or non-volatile memory, such as read only memory (ROM) or flash RAM. The memory 503 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 503 may include program units 505 and program data 512. In one embodiment, the program units 505 may include a conversion unit 506, a deciding unit 507, a determination unit 508, a first prediction unit 509, a selection unit 510 and a second prediction unit 511.

The conversion unit 506 is configured to convert a historical data sequence of the user behavior number of the word from a time domain to a frequency domain.

The deciding unit 507 is configured to ascertain one or more estimated cycles of the historical data sequence, and an effect rate value of each of one or more estimated cycles based on the frequency domain of the historical data sequence.

The determination unit 508 is configured to determine whether the historical data sequence is stable based on the each of one or more estimated cycles and the effect rate value of the each of one or more estimated cycles.

The first prediction unit 509 is configured to calculate the user behavior number of a prediction point based on an average value of user behavior numbers of the historical data sequence before the prediction point, if the historical data sequence is stable.

The selection unit 510 is configured to select a main cycle and a singularity of the historical data sequence based on the each of one or more estimated cycles and the effect rate value of each of one or more estimated cycles, if the historical data sequence is not stable.

The second prediction unit 511 is configured to calculate the user behavior number of a prediction point based on the selected main cycle and the selected singularity.

In one embodiment, the selection unit 510 may include the following sub-units. A first selection sub-unit is configured to select a first estimated cycle of the one or more estimated cycles as the main cycle, the first estimated cycle being within the configured main cycle range and having a largest effect rate value. A second selection sub-unit is configured to select a second estimated cycle of the one or more estimated cycles as the singularity. Meanwhile, one effect rate value of the second estimated cycle is larger than effect rate values of other estimated cycles of the one or more estimated cycles. The other estimated cycles exclude the first estimated cycle, and the one or more estimated cycles include multiple estimated cycles.

Figure 6:
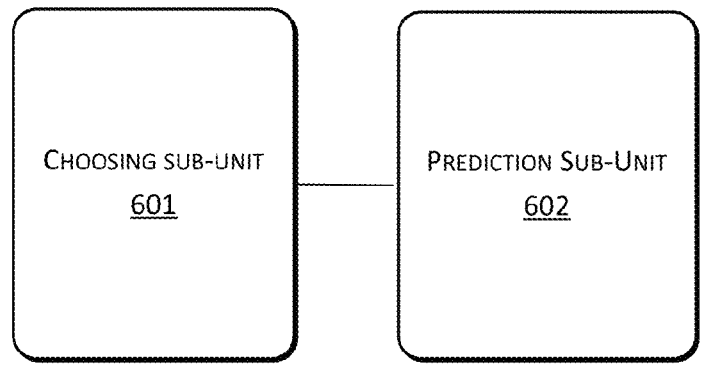
FIG. 6 is a block diagram of one example implementation of a second prediction unit employed in the apparatus of FIG. 5.

In one embodiment, the second prediction unit 511, as illustrated in FIG. 6, may include the following sub-units. A choosing sub-unit 601 is configured to form a training data sequence comprising a set of data associated with individual historical data points of the historical sequence after a historical data point corresponding to the selected singularity. A prediction sub-unit 602 is configured to calculate the user behavior number of the prediction point based on a model of the training data sequence, the model being created by using a time sequence model.

Figure 7:
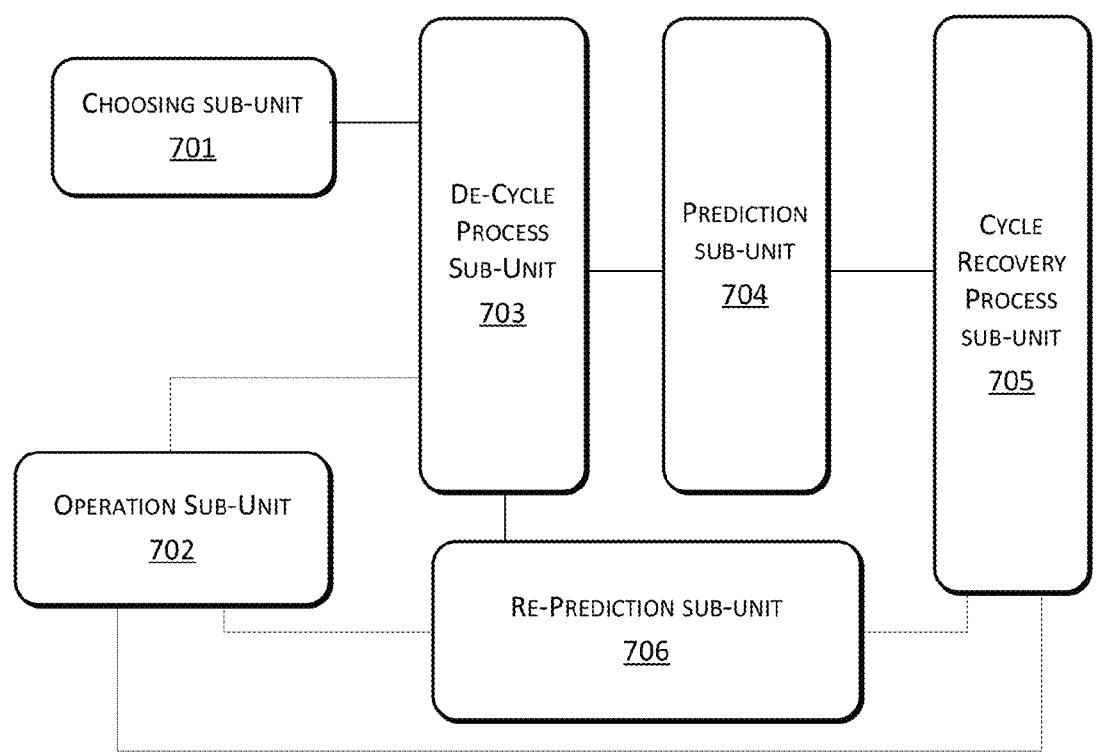
FIG. 7 is a block diagram of another implementation of the second prediction unit employed in the apparatus of FIG. 5.

In another embodiment, the second prediction unit 511, as illustrated in FIG. 7, may include the following sub-units.

A choosing sub-unit 701 is configured to form a first training data sequence comprising a set of data associated with individual historical data points of the historical data sequence after a point corresponding to the selected singularity.

An operation sub-unit 702 is configured to obtain a cycle average value by averaging a set of first training data of the first training sequence, each of the set of first training data being corresponding to one or more main cycle locations.

A de-cycle process sub-unit 703 is configured to calculate a second training data sequence without cycles by subtracting, from each training data of the training data sequence, a cycle average value corresponding to individual main cycle locations, and form a second training sequence without cycle that comprises the set of second training data.

A prediction sub-unit 704 is configured to calculate one user behavior number of the prediction point without a cycle based on a model of the training data sequence, the model being created by using a time sequence model.

A cycle recovery process sub-unit 705 is configured to calculate the user behavior number of the prediction point by adding the one user behavior number and the cycle average value corresponding to one of the one or more main cycle locations.

The aforementioned structure of the second prediction unit 506 can further include a re-prediction sub-unit 706. The re-prediction sub-unit 706 is configured to set an average value of training data of the second training sequence without cycle as the one user behavior number of the prediction point without a cycle after determining that a deviation of the behavior number of the prediction point exceeds a configured deviation threshold, the training data being associated with one main cycle before the prediction point.

In accordance with the method and the apparatus of predicting a user behavior number of a word provided by the present disclosure, first, a historical data sequence of a user behavior number of a word is converted from a time domain to a frequency domain so as to decide each estimated cycle and its effect rate value of the historical data sequence, and to determine whether the user behavior number of the word varies dramatically and/or regularly. For a stable sequence, an average value algorithm is used for prediction; for an unstable sequence, a main cycle and a singularity are selected for obtaining a user behavior number of the prediction point. As different prediction algorithms are used for different types of historical data sequences, the operational loading of a system is reduced. For the historical data of a stable sequence, the future data can be rapidly predicted; for the historical data of an unstable sequence, the future data can be accurately and reliably predicted.

In accordance with the embodiments of present disclosure, the method and the apparatus of predicting a user behavior number of a word provided by the present disclosure can be implemented in situations that a large number of words are used. In addition, the conversion from a time domain to a frequency domain and the prediction algorithms for a stable sequence and an unstable sequence can be implemented easily. Consequently, the amount and the complexity of operation of equipment can be reduced, and so can the consumption of the equipment.

In the embodiments of the present disclosure, for the unstable sequence, historical data points after the selected singularity of the historical data sequence are chosen for composing a training data sequence, a time sequence model is used to create a model and to get a solution, and errors resulted from the reverse conversion from the frequency domain to the time domain can be reduced via a de-cycle process and a cycle recovery process. Accordingly, the amount and the complexity of operation of equipment can be further reduced, and so can the consumption of the equipment; the accuracy of prediction can be further improved.

By reading the above implementations, persons in the technical field would clearly understand that the embodiments of the present disclosure can be a method, an apparatus or a product of computer procedures. Therefore, the present disclosure can be implemented in the form of hardware, software, or the combination of the both. Besides, the present disclosure can adopt one or more products of computer procedures which contain the computer accessible procedure codes which can be implemented in the computer storage medium (including but not limited to disk memory, CD-ROM, optical memory, etc.).

The present disclosure is depicted in accordance with the flow charts and/or block diagrams of the method, the apparatus and the product of the computer procedures of the various embodiments. It should be understood that each flow and/or block and the combinations of the flow charts and/or the flow of the block diagrams and/or the blocks can be implemented by the instructions of the computer procedure. These instructions of computer procedures can be provided to the general computers, the specific computers, the embedded processors, or other programmable data processing equipment to generate a machine, which is a device capable of implementing a flow or more flows of a flow charts and/or a block or more blocks of a block diagrams through a computer or a processor of other programmable data processing equipment.

These instructions of the computer procedures can also be stored in the computer readable memory which can instruct the computer or other programmable data processing equipment to operate in certain ways, so that the instructions stored in the computer readable memory generates the products including instruction devices, which can implement a flow or more flows of a flow charts and/or a block or more blocks of a block diagrams.

These instructions of the computer procedures can also be installed in the computer or other programmable data processing equipment in order to operate a series of steps in the computer or other programmable data processing equipment to generates the process which is implemented by a computer, so that the instructions operated in the computer or other programmable equipment provides the steps of implementing a flow or more flows of a flow charts and/or a block or more blocks of a block diagrams.

The embodiments disclosed herein are merely example implementations of the present disclosure. Persons skilled in the art would understand that although the present disclosure is described in certain embodiments, any changes and modifications to the embodiments without departing the spirits of the present disclosure should be considered as covered by Claims.

Persons in the technical field would understand that the modules can be distributed in the devices of the embodiments or be distributed in one or more devices which are different to the embodiments of the present disclosure. The modules in the embodiments can be integrated or distributed separately. The modules can be integrated as one module or be further divided into multiple sub-modules. The aforementioned embodiments are depicted merely for illustration and do not refer to the advantages or disadvantages of the present disclosure.

Although certain specific embodiments are presented, the scope of the present disclosure is not limited to the embodiments. Any changes to the embodiments that persons skilled in the art would think of fall in to the scope of the present disclosure.

What is claimed is:

1. A method of predicting a user behavior number of a word, the method comprising:
converting a historical data sequence of user behavior numbers associated with the word from a time domain to a frequency domain;
ascertaining one or more estimated cycles of the historical data sequence, and an effect rate value of each of the one or more estimated cycles based on the frequency domain of the historical data sequence;
determining whether the historical data sequence is stable based on each of the one or more estimated cycles and the effect rate value of each of the one or more estimated cycles, the determining including determining whether the effect rate value of each of the one or more estimated cycles exceeds a configured effect rate threshold;
if the historical data sequence is stable, calculating a user behavior number of a prediction point based on an average value of the user behavior numbers of the historical data sequence before the prediction point; and
if the historical data sequence is not stable:
selecting a main cycle and a singularity of the historical data sequence based on the one or more estimated cycles and the effect rate value of each of the one or more estimated cycles, the selecting including:
selecting an estimated cycle of the one or more estimated cycles as the main cycle, the estimated cycle being within a configured main cycle range and having a largest effect rate value; and
selecting another estimated cycle of the one or more estimated cycles as the singularity, an effect rate value of the another estimated cycle being larger than effect rate values of other estimated cycles of the one or more estimated cycles, the other estimated cycles excluding the estimated cycle selected as the main cycle, the one or more estimated cycles including multiple estimated cycles; and
calculating the user behavior number of a prediction point based on the selected main cycle and the selected singularity.

2. The method as recited in claim 1, wherein the calculating of the user behavior number of the prediction point based on the selected main cycle and the selected singularity comprises:
forming a training data sequence comprising a set of data associated with individual historical data points of the historical sequence after a point corresponding to the selected singularity; and
calculating the user behavior number of the prediction point based on a model of the training data sequence, the model being created by using a time sequence model.

3. The method as recited in claim 1, wherein the calculating of the user behavior number of the prediction point based on the selected main cycle and the selected singularity comprises:
forming a first training data sequence comprising a set of data associated with individual historical data points of the historical data sequence after a historical data point corresponding to the selected singularity;
obtaining a cycle average value by averaging a set of first training data of the first training sequence, each of the set of first training data corresponding to one or more main cycle locations;
calculating a set of second training data by subtracting the cycle average value from each of the set of first training data;
forming a second training sequence without a cycle that comprises the set of second training data;
calculating one user behavior number of the prediction point without the cycle based on a model of the second training data sequence, the model being created by using a time sequence model; and
calculating the user behavior number of the prediction point by adding the one user behavior number and the cycle average value corresponding to one of the one or more main cycle locations.

4. The method as recited in claim 3, further comprising:
selecting an average value of training data of the second training sequence without the cycle as the one user behavior number of the prediction point without the cycle after determining a deviation of the user behavior number of the prediction point exceeds a configured deviation threshold, the training data being associated with one main cycle before the prediction point.

5. The method as recited in claim 1, wherein the converting from the time domain to the frequency domain of the historical data sequence comprises converting by using a Fast Fourier Transformation (FFT) or a Wavelet Transformation.

6. The method as recited in claim 1, wherein the user behavior number of the word comprises traffic or a click rate of the word.

7. The method as recited in claim 1, wherein the one or more estimated cycles have two or more different cycles.

8. An apparatus of predicting a user behavior number of a word, comprising:
one or more processors;
a computer storage medium having stored thereon computer executable instructions that are executable by the one or more processors to form multiple instruction devices comprising:
a conversion unit to convert a historical data sequence of user behavior numbers of the word from a time domain to a frequency domain;
a deciding unit to decide one or more estimated cycles of the historical data sequence, and an effect rate value of each of the one or more estimated cycles based on the frequency domain of the historical data sequence;
a determination unit to determine whether the historical data sequence is stable based on each of the one or more estimated cycles and the effect rate value of each of the one or more estimated cycles, the determining including determining whether the effect rate value of each of the one or more estimated cycles exceeds a configured effect rate threshold;
a first prediction unit to calculate a user behavior number of a prediction point based on an average value of user behavior numbers of the historical data sequence before the prediction point, if the historical data sequence is stable;
a selection unit to select a main cycle and a singularity of the historical data sequence based on the one or more estimated cycles and the effect rate value of each of the one or more estimated cycles, if the historical data sequence is not stable, the selection unit including:
  a storing sub-unit to store a configured main cycle range;
  a first selection sub-unit to select a first estimated cycle of the one or more estimated cycles as the main cycle, the first estimated cycle being within the configured main cycle range and having a largest effect rate value; and
  a second selection sub-unit to select a second estimated cycle of the one or more estimated cycles as the singularity, an effect rate value of the second estimated cycle being larger than effect rate values of other estimated cycles of the one or more estimated cycles, the other estimated cycles excluding the first estimated cycle, the one or more estimated cycles comprising multiple estimated cycles; and
  a second prediction unit to calculate the user behavior number of a prediction point based on the selected main cycle and the selected singularity.

9. The apparatus as recited in claim 8, wherein the second prediction unit comprises:
  a choosing sub-unit to form a training data sequence comprising a set of data associated with individual historical data points of the historical sequence after a historical data point corresponding to the selected singularity; and
  a prediction sub-unit to calculate the user behavior number of the prediction point based on a model of the training data sequence, the model being created by using a time sequence model.

10. The apparatus as recited in claim 8, wherein the second prediction unit comprises:
  a choosing sub-unit to form a first training data sequence comprising a set of data associated with individual historical data points of the historical data sequence after a point corresponding to the selected singularity;
  an operation sub-unit to obtain a cycle average value by averaging a set of first training data of the first training sequence, each of the set of first training data being corresponding to one or more main cycle locations;
  a de-cycle process sub-unit to:
    calculate a second training data sequence without a cycle by subtracting, from each training data of the training data sequence, the cycle average value corresponding to individual main cycle locations; and
    form a second training sequence without the cycle that comprises the set of second training data;
  a prediction sub-unit to calculate one user behavior number of the prediction point without the cycle based on a model of the training data sequence, the model being created by using a time sequence model; and
  a cycle recovery process sub-unit to calculate the user behavior number of the prediction point by adding the one user behavior number and the cycle average value corresponding to one of the one or more main cycle locations.

11. The apparatus as recited in claim 10, wherein the second prediction unit comprises:
  a re-prediction sub-unit to:
    select an average value of training data of the second training sequence without a cycle as the user behavior number of the prediction point without the cycle after determining that a deviation of the behavior number of the prediction point exceeds a configured deviation threshold, the training data being associated with one main cycle before the prediction point.

12. The apparatus as recited in claim 8, wherein the one or more estimated cycles have two or more different cycles.

13. The apparatus as recited in claim 8, wherein the user behavior number of the word comprises traffic or a click rate of the word.

14. The apparatus as recited in claim 8, wherein the converting from the time domain to the frequency domain of the historical data sequence comprises converting by using a Fast Fourier Transformation (FFT) or a Wavelet Transformation.

15. A computer storage medium having stored thereon computer executable instructions configured to predict a user behavior number of a word, that are executable by one or more processors to perform acts comprising:
  converting a historical data sequence of user behavior numbers associated with the word from a time domain to a frequency domain;
  ascertaining one or more estimated cycles of the historical data sequence, and an effect rate value of each of the one or more estimated cycles based on the frequency domain of the historical data sequence;
  determining whether the historical data sequence is stable based on each of the one or more estimated cycles and the effect rate value of each of the one or more estimated cycles, the determining including determining whether the effect rate value of each of the one or more estimated cycles exceeds a configured effect rate threshold;
  if the historical data sequence is stable, calculating a user behavior number of a prediction point based on an average value of the user behavior numbers of the historical data sequence before the prediction point; and
  if the historical data sequence is not stable:
    selecting a main cycle and a singularity of the historical data sequence based on the one or more estimated cycles and the effect rate value of each of the one or more estimated cycles, the selecting including:
      selecting an estimated cycle of the one or more estimated cycles as the main cycle, the estimated cycle being within a configured main cycle range and having a largest effect rate value; and
      selecting another estimated cycle of the one or more estimated cycles as the singularity, an effect rate value of the another estimated cycle being larger than effect rate values of other estimated cycles of the one or more estimated cycles, the other estimated cycles excluding the estimated cycle selected as the main cycle, the one or more estimated cycles including multiple estimated cycles; and
    calculating the user behavior number of a prediction point based on the selected main cycle and the selected singularity.

16. The computer storage medium as recited in claim 15, wherein the calculating of the user behavior number of the prediction point based on the selected main cycle and the selected singularity comprises:
  forming a training data sequence comprising a set of data associated with individual historical data points of the historical sequence after a point corresponding to the selected singularity; and
  calculating the user behavior number of the prediction point based on a model of the training data sequence, the model being created by using a time sequence model.

17. The computer storage medium as recited in claim 15, wherein the calculating of the user behavior number of the prediction point based on the selected main cycle and the selected singularity comprises:

forming a first training data sequence comprising a set of data associated with individual historical data points of the historical data sequence after a historical data point corresponding to the selected singularity;

obtaining a cycle average value by averaging a set of first training data of the first training sequence, each of the set of first training data being corresponding to one or more main cycle locations;

calculating a set of second training data by subtracting the cycle average value from each of the set of first training data;

forming a second training sequence without a cycle that comprises the set of second training data;

calculating one user behavior number of the prediction point without the cycle based on a model of the second training data sequence, the model being created by using a time sequence model; and calculating the user behavior number of the prediction point by adding the one user behavior number and the cycle average value corresponding to one of the one or more main cycle locations.

18. The computer storage medium as recited in claim 15, wherein the converting from the time domain to the frequency domain of the historical data sequence comprises converting by using a Fast Fourier Transformation (FFT) or a Wavelet Transformation.

19. The computer storage medium as recited in claim 15, wherein the user behavior number of the word comprises traffic or a click rate of the word.

20. The computer storage medium as recited in claim 15, wherein the one or more estimated cycles have two or more different cycles.

* * * * *